US 12,221,825 B2

(12) United States Patent
Sun et al.

(10) Patent No.: US 12,221,825 B2
(45) Date of Patent: Feb. 11, 2025

(54) FIREPROOF CABINET BODY STRUCTURE AND FIREPROOF SAFETY CABINET

(71) Applicant: Justrite Safety Technology (Wuxi) Co., Ltd., Wuxi (CN)

(72) Inventors: Ji Sun, Wuxi (CN); Hu Shi, Wuxi (CN); Chunxia Lyv, Wuxi (CN)

(73) Assignee: Justrite Safety Technology (Wuxi) Co., Ltd., Wuxi (CN)

( * ) Notice: Subject to any disclaimer, the term of this patent is extended or adjusted under 35 U.S.C. 154(b) by 107 days.

(21) Appl. No.: 18/187,941

(22) Filed: Mar. 22, 2023

(65) Prior Publication Data
US 2023/0263302 A1    Aug. 24, 2023

Related U.S. Application Data

(63) Continuation of application No. PCT/CN2022/077270, filed on Feb. 22, 2022.

(30) Foreign Application Priority Data

Feb. 18, 2022  (CN) .......................... 202210149669.1

(51) Int. Cl.
*E05G 1/024*    (2006.01)
*A47B 81/00*    (2006.01)
(Continued)

(52) U.S. Cl.
CPC .............. *E05G 1/024* (2013.01); *A47B 81/00* (2013.01); *A47B 96/205* (2013.01); *E05F 15/72* (2015.01);
(Continued)

(58) Field of Classification Search
CPC ......... E05G 1/024; E05G 1/026; A47B 81/00; A47B 96/205; A47B 47/0083;
(Continued)

(56) References Cited

U.S. PATENT DOCUMENTS 3,762,787 A * 10/1973 Grubb ..................... E05G 1/024
312/409
4,258,511 A *  3/1981 Strain ................... E04H 1/1238
52/406.1
(Continued)

FOREIGN PATENT DOCUMENTS

CN         104018583 A     9/2014
CN         104716584 A     6/2015
(Continued)

OTHER PUBLICATIONS

ES1059913U translation (Year: 2005).*
(Continued)

*Primary Examiner* — Hiwot E Tefera
(74) *Attorney, Agent, or Firm* — Westbridge IP LLC

(57) ABSTRACT

Disclosed are a fireproof cabinet body structure and a fireproof safety cabinet. The fireproof cabinet body structure comprises a cabinet body, the cabinet body comprises an inner panel, a gypsum board and a keel frame, and the inner panel and the gypsum board are fixedly mounted on two sides of the keel frame. The fireproof safety cabinet comprises a cabinet body and a cabinet door, the cabinet body is provided with an air inlet and an air outlet, ventilation fire-retardant valves are mounted at the air inlet and the air outlet, an inner side of the cabinet body is provided with an air supply opening corresponding to the air inlet and an air return opening corresponding to the air outlet, and the cabinet body is provided with electrostatic grounding bolts connected with the keel frame at the top part and/or side part of the cabinet body.

11 Claims, 24 Drawing Sheets

(51) Int. Cl.
*A47B 96/20* (2006.01)
*E05F 15/72* (2015.01)
*E06B 5/16* (2006.01)
*A47B 47/00* (2006.01)
*E06B 3/70* (2006.01)

(52) U.S. Cl.
CPC .......... *E06B 5/164* (2013.01); *A47B 47/0083* (2013.01); *E06B 2003/7051* (2013.01)

(58) Field of Classification Search
CPC ....... A47B 96/00; A47B 96/206; E05F 15/72; E06B 5/164; E06B 2003/7051; E06B 5/006; E06B 5/16; E05Y 2900/21; A62C 3/002
USPC ............................................ 312/265.1–265.4
See application file for complete search history.

(56) References Cited

U.S. PATENT DOCUMENTS

| | | | | | |
|---|---|---|---|---|---|
| 4,413,869 | A | * | 11/1983 | Pichler | E05G 1/024 428/920 |
| 5,167,098 | A | * | 12/1992 | Blackwelder | E04H 5/02 52/263 |
| 5,171,079 | A | * | 12/1992 | Bayerle | A62C 13/78 312/409 |
| 5,352,032 | A | * | 10/1994 | Cisternino | A47B 47/00 312/265.3 |
| 5,695,263 | A | * | 12/1997 | Simon | H05K 7/183 403/231 |
| 5,813,174 | A | * | 9/1998 | Waller | E04H 9/06 109/78 |
| 6,044,776 | A | * | 4/2000 | Alizade | E05G 1/024 109/78 |
| 9,316,015 | B1 | * | 4/2016 | Elliott | E04B 1/98 |
| 10,260,272 | B1 | * | 4/2019 | Ivester | E05G 1/024 |
| 10,619,398 | B1 | * | 4/2020 | Ivester | E05G 1/024 |
| 2003/0094885 | A1 | * | 5/2003 | Cleveland | E05G 1/024 312/409 |
| 2009/0007501 | A1 | | 1/2009 | Belyan | |
| 2016/0273259 | A1 | * | 9/2016 | DeBaldo | E05G 1/024 |
| 2020/0360741 | A1 | * | 11/2020 | Liu | B32B 13/045 |
| 2021/0140222 | A1 | * | 5/2021 | Meyer | E05G 1/026 |

FOREIGN PATENT DOCUMENTS

| | | | | |
|---|---|---|---|---|
| CN | 112007294 A | | 12/2020 | |
| CN | 213030254 U | | 4/2021 | |
| DE | 4207509 C2 | * | 12/1994 | ............... A62C 3/00 |
| DE | 10349952 A1 | * | 6/2005 | ............. A47B 63/00 |
| DE | 102011000258 | * | 5/2012 | |
| DE | 202014101934 | * | 5/2014 | |
| DE | 202014101934 U1 | | 5/2014 | |
| EP | 0149525 A2 | * | 7/1985 | |
| EP | 3907838 A1 | | 11/2021 | |
| ES | 1059913 U | | 6/2005 | |

OTHER PUBLICATIONS

CN213030254U translation (Year: 2021).*
International Search Report issued in corresponding PCT Application No. PCT/CN2022/077270, dated Oct. 25, 2022.
Extended European Search Report issued in counterpart European Patent Application No. 22871047.1, dated Mar. 21, 2024.

* cited by examiner

FIREPROOF CABINET BODY STRUCTURE AND FIREPROOF SAFETY CABINET

CROSS-REFERENCE TO RELATED APPLICATIONS

The present application is a continuation of International Patent Application No. PCT/CN2022/077270, filed on Feb. 22, 2022, which claims priority to Chinese Patent Application No. 202210149669.1, filed on Feb. 18, 2022. The disclosures of the aforementioned applications are hereby incorporated by reference in their entireties.

TECHNICAL FIELD

The present application relates to the technical field of safety cabinets, and in particular to a fireproof cabinet body structure and a fireproof safety cabinet.

BACKGROUND

The safety cabinet is used to store various productive or living substances or materials. It needs to not only comply with the requirements of fire protection and safety laws and regulations, but also have a strong fireproof capability for flammable production materials or products, so as to reduce the risk of a destructive fire accident in production or workplaces.

Since the gypsum board has characteristics such as light weight, convenient processing, sound insulation and heat insulation, and better fireproof performance, it has become the main fireproof material of fireproof safety cabinets. However, due to the insufficient load-bearing capacity of most gypsum boards, the cabinet body formed by the gypsum board is difficult to bear the strength of bolt connection, and cannot become a main body supporting frame of the safety cabinet, which affects the strength and the fireproof and safety performance of the safety cabinet. However, gypsum boards with higher load-bearing capacity are difficult to achieve mass production due to higher production costs, which affects economic benefits.

SUMMARY

For the defect that the gypsum board is difficult to be used in a safety cabinet as a main body supporting frame, which affects the fireproof and safety performance, or the gypsum board is difficult to achieve mass production due to higher production cost, which affects economic benefit, the present application provides a fireproof cabinet body structure which is simple and has low production cost, a strong load-bearing capacity and high fireproof and safety performance; and to this end, the present application further provides a fireproof safety cabinet.

The present application adopts technical schemes as follows. A fireproof cabinet body structure comprises a cabinet body, wherein an opening is arranged on one side of the cabinet body and is suitable for mounting a cabinet door, and the cabinet body comprises a keel frame and at least one layer of gypsum board fixed on an outer vertical surface of the keel frame; adjacent gypsum boards are seamlessly pieced together; the keel frame has a rigidity greater than that of the gypsum board; and a plurality of support legs, wherein the plurality of support legs penetrate through the gypsum board and are fixedly connected with the keel frame.

Further, a direction of the supporting force of any one of the support legs is the same as an extending direction of a vertical beam in the keel frame.

Further, the keel frame is a steel keel frame.

Further, the keel frame comprises rectangular tubes and angle steels; a side surface of the cabinet body that is opposite to the opening is provided with the rectangular tubes along the center line thereof; except that two edges in the keel frame that are located on the side surface and parallel to the rectangular tubes of the center line adopt angle steels, and the remaining edges in the keel frame adopt rectangular tubes.

Further, an inner vertical surface of the keel frame is further provided with an inner panel; and a gap layer is formed by surrounding the rectangular tubes parallel to two sides of any one of the angle steels with the inner panel and the gypsum board.

Further, two opposite inner panels are provided with an air supply opening and an air return opening which communicate with the corresponding gap layer; an air inlet corresponding to the air supply opening and an air outlet corresponding to the air return opening are arranged on the gypsum board located at a distal end of the gap layer; ventilation fire-retardant valves are arranged on the air inlet and the air outlet; and one of two gap layers forms an air inlet channel, and the other gap layer forms an air outlet channel.

Further, the ventilation fire-retardant valve comprises a valve body and fire-retardant discs, a fixed shaft is mounted on the valve body, the fire-retardant discs are arranged on the fixed shaft in a penetrating manner and are oppositely disposed, two ends of a fuse link are hooked to a second hook on the fire-retardant disc, the fixed shaft is further provided with a torsion spring in a penetrating manner, and torsion feet of the torsion spring are abutted against an inner side surface of the fire-retardant disc.

Further, at least two layers of gypsum boards are arranged on the outer vertical surface of the keel frame; and the gypsum boards between layers are stacked on each other, and edges thereof form a stepped abutting structure.

Further, reinforcing ribs are arranged in the keel frame.

Further, peripheral side walls and an outer surface of the bottom part of the cabinet body are covered with metal sheets, and the top part of the cabinet body is covered with an outer panel.

Further, the top part and/or side walls of the cabinet body are provided with electrostatic grounding devices connected with the keel frame.

A fireproof safety cabinet comprises the fireproof cabinet body structure described above and a cabinet door mounted on an opening at one side of the cabinet body; and a door frame arranged along an edge of the opening of the cabinet body and fixedly connected with the keel frame; wherein the door frame is a steel structure frame; both the door frame and the keel frame are fixedly connected with the support legs; and the cabinet door is hinged on the door frame.

Further, the cabinet door comprises an outer decorative metal plate and an inner decorative plate, and a steel frame and a fireproof layer are sequentially arranged between the outer decorative metal plate and the inner decorative plate from outside to inside.

A handle is arranged on the cabinet door; and a stainless steel conductor is arranged on a surface of the cabinet door and/or the handle.

Further, the fireproof safety cabinet further comprises a metal shelf frame, wherein the metal shelf frame is mounted on two opposite side walls of the cabinet body by metal fasteners, the metal fasteners are fixedly mounted to the keel frame, and the metal shelf is hooked to a first hook on the metal shelf frame.

Further, a high temperature fire-retardant cloth and a rubber fire-retardant expansion strip are arranged at a gap between the cabinet body and the cabinet door.

Further, the fireproof safety cabinet further comprises a cabinet door deactivation device, wherein the cabinet door deactivation device comprises a door closer and a deactivation assembly, the deactivation assembly comprises an elastomer buckle, a metal adapter plate and a metal fixing bottom plate, the elastomer buckle is fixedly mounted to the metal adapter plate, the metal adapter plate is fixedly connected with the metal fixing bottom plate through a fusion layer, the metal fixing bottom plate is mounted to the cabinet door, and the elastomer buckle is provided with a clamping groove matched with a rocker arm of the door closer.

After the present application adopts the above structure, the cabinet body adopts a structure where the gypsum board and the inner panel are fixedly mounted to the keel frame, so that the keel frame can effectively support the gypsum board and the inner panel, wherein the gypsum board does not need to bear load but only exerts a fireproof effect, therefore, the common gypsum board may be adopted as an outer wall of the cabinet body, which has a simple structure, low production cost, a strong load-bearing capacity and high fireproof and safety performance; and in addition, the inner panel may not only improve the aesthetic property inside the cabinet body, but also improve the balance and stability of the cabinet body.

Since the keel frame of the cabinet body is located between the gypsum board and the inner panel, the support force of the keel frame to the cabinet body and the ground may be vertically transmitted up and down through the support legs outside the bottom plate of the cabinet body, and the support legs located at a front end of the cabinet body may further support the door frame, which further improves the load-bearing capacity of the fireproof safety cabinet.

BRIEF DESCRIPTION OF THE DRAWINGS

In order to more clearly illustrate the technical schemes in the embodiments of the present application or in the prior art, the drawings required to be used in the description of the embodiments or the prior art are briefly introduced below. It is obvious that the drawings in the description are some embodiments of the present application, and those of ordinary skill in the art can obtain other drawings according to these drawings without creative efforts. In the drawings.

DETAILED DESCRIPTIONS OF THE EMBODIMENTS

The technical schemes of the present application are clearly and completely described below with reference to the drawings, and it is obvious that the described embodiments are a part of the embodiments of the present application, and not all of the embodiments. Based on the embodiments of the present application, all other embodiments obtained by those of ordinary skill in the art without creative effort shall fall within the protection scope of the present application.

In the description of the present application, it should be noted that directions or positional relationships indicated by terms such as "central", "on", "under", "left", "right", "vertical", "horizontal", "in", "out" and the like are those shown based on the drawings, are merely intended to facilitate and simplify the description of the present application rather than indicate or imply that the indicated device or element must have a specific direction and be structured and operated according to the specific direction, and should not be construed as limiting the present application. In addition, the terms "first", "second" and "third" are used herein for descriptive purposes only and should not be construed as indicating or implying relative importance.

In the description of the present application, it should be noted that, unless otherwise clearly specified and defined, the terms "mount", "interconnect" and "connect" should be construed broadly and, for example, may be a fixed connection, a detachable connection, or an integral connection; may be a mechanical or electrical connection; or may be a direct connection or an indirect connection through a medium, or may be an intercommunication between two elements. For those of ordinary skill in the art, the specific meanings of the aforementioned terms in the present application can be understood according to specific conditions.

In addition, the technical features involved in different embodiments of the present application described below may be combined with each other as long as they do not conflict with each other.

Figure 1:
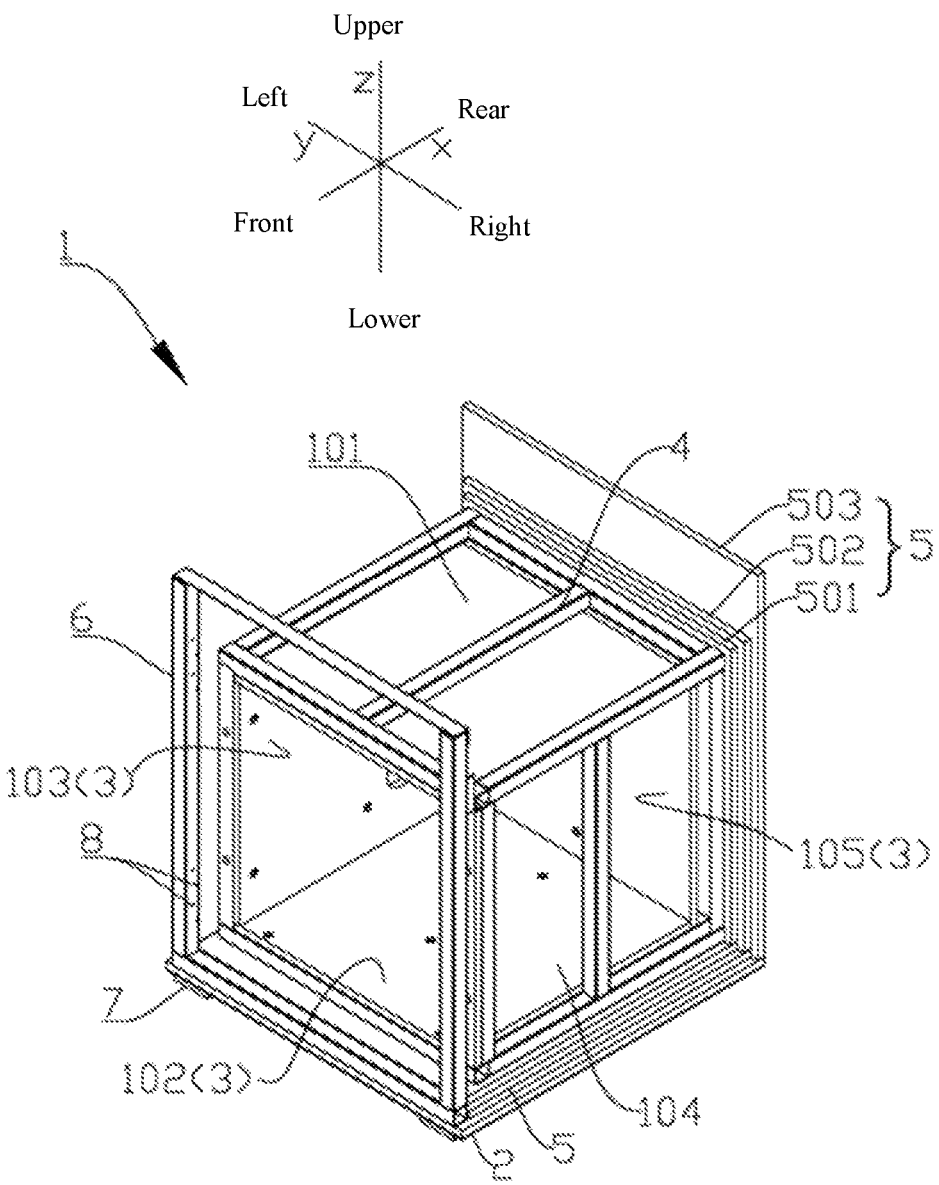
FIG. 1 is a schematic diagram of a first cabinet body structure according to the present application from a perspective.
Figure 2:
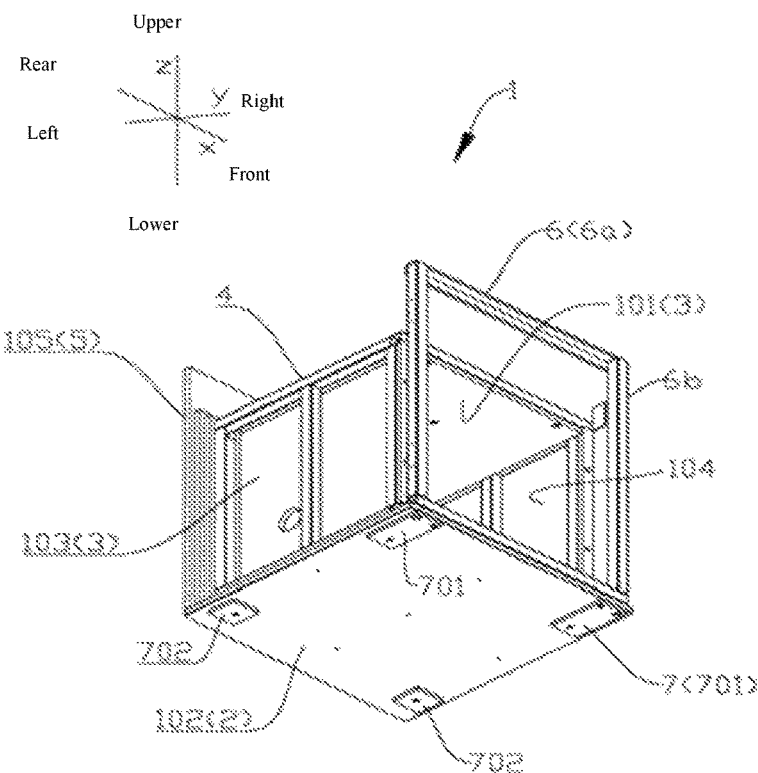
FIG. 2 is a schematic diagram of a first cabinet body structure according to the present application from another perspective.
Figure 3:
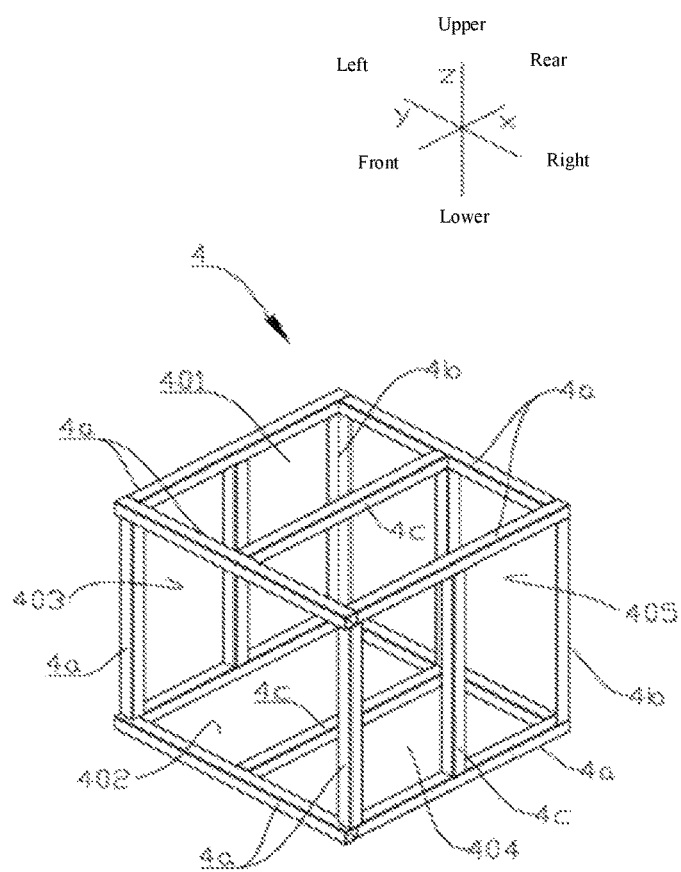
FIG. 3 is a schematic diagram of a keel frame structure of a first cabinet body structure according to the present application.

For the convenience of description and a more intuitive understanding of the present application, in FIGS. 1 to 3, the x-axis of a spatial rectangular coordinate system represents the front and rear directions, the y-axis thereof represents the left and right directions, and the z-axis represents the up and down directions.

As shown in FIGS. 1 to 6, the present application provides a fireproof cabinet body structure, which comprises a cabinet body 1, wherein the cabinet body 1 is integrally formed into a cubic structure, one side of the cabinet body is provided with an opening, and the opening is suitable for mounting a cabinet door 9. The cabinet body 1 comprises a keel frame 4 and at least one layer of gypsum board 5 fixed on an outer vertical surface of the keel frame 4, adjacent gypsum boards 5 are seamlessly pieced together, and the keel frame 4 has a rigidity greater than that of the gypsum board 5. A plurality of support legs 7 penetrate through the gypsum board 5 and are fixedly connected with the keel frame 4, so that the stress on the whole cabinet body 1 is transmitted to the ground by the keel frame 4 through the support legs 7, which avoids the direct stress on the gypsum board 5, improves the stability of the structure, and prolongs the service life.

In this embodiment, a direction of the supporting force of any one of the support legs 7 is the same as an extending direction of a vertical beam in the keel frame 4.

Further, the support legs 7 are arranged in one-to-one correspondence with the vertical beams in the keel frame 4, so that the stress transmission is more direct.

In this embodiment, the inner panel 3 and the gypsum board 5 are fixedly mounted on two sides of the keel frame 4, the cabinet body 1 adopts a structure where the gypsum board 5 and the inner panel 3 are fixedly mounted to an outer vertical surface and an inner vertical surface of the keel frame 4, respectively, and the keel frame 4 can effectively support the gypsum board 5 and the inner panel 3, so that the gypsum board 5 does not need to bear load but only exerts a fireproof effect; therefore, the common gypsum board 5 may be adopted as an outer wall of the cabinet body 1, which has a simple structure, low production cost, a strong load-bearing capacity and high fireproof and safety performance; and in addition, the inner panel 3 may not only improve the aesthetic property inside the cabinet body 1, but also improve the balance and stability of the cabinet body 1.

Figure 4:
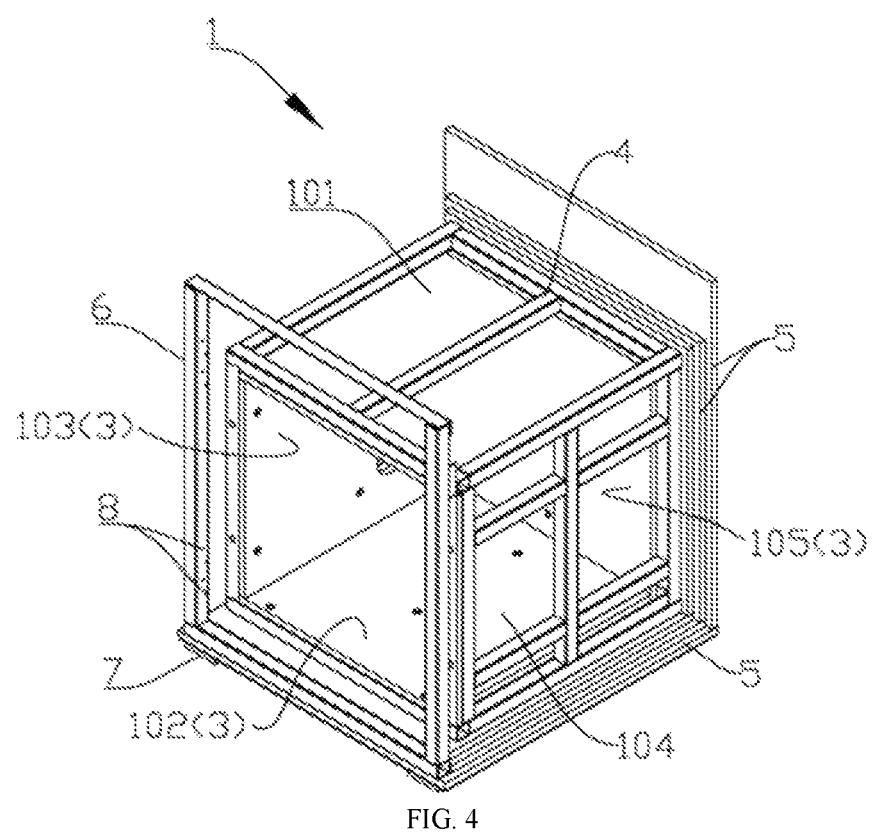
FIG. 4 is a schematic diagram of a second cabinet body structure according to the present application.
Figure 5:
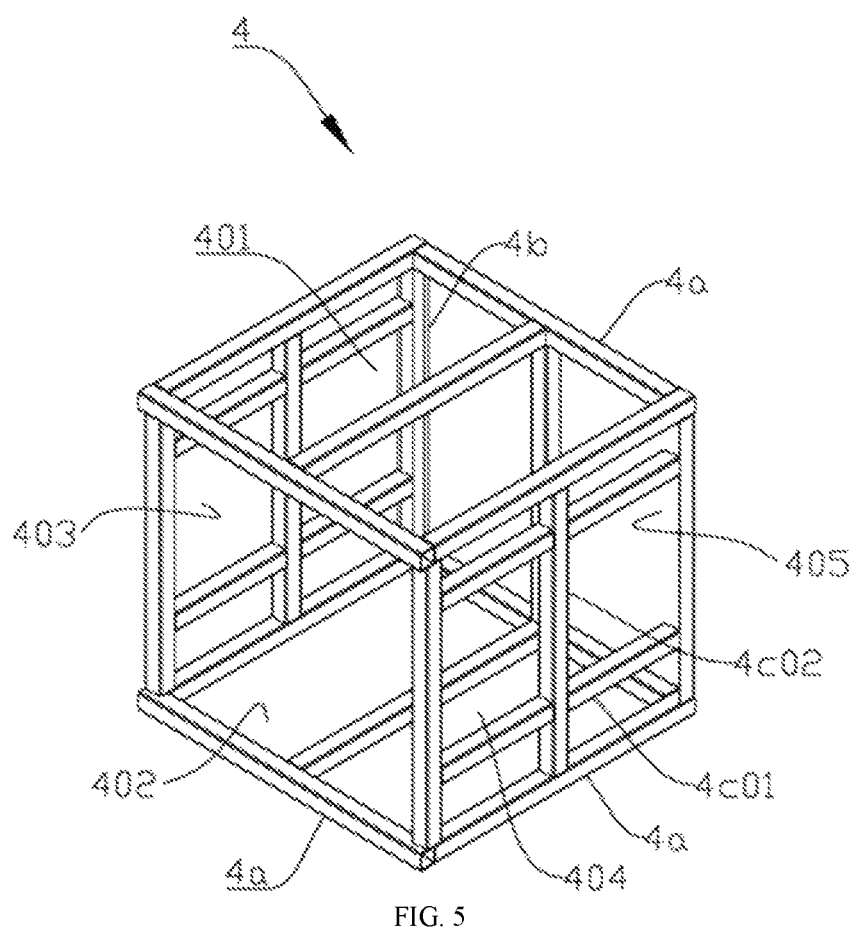
FIG. 5 is a schematic diagram of a keel frame structure of a second cabinet body structure according to the present application.
Figure 6:
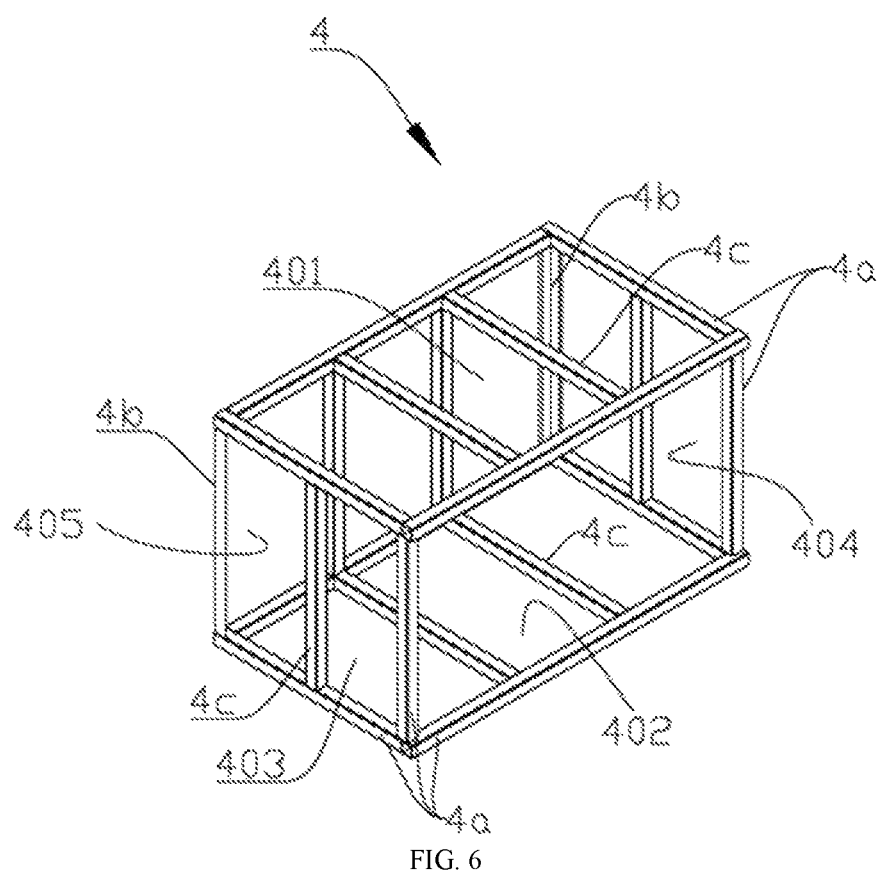
FIG. 6 is a schematic diagram of a keel frame structure of a third cabinet body structure according to the present application.

As shown in FIGS. 1 to 6, the keel frame 4 includes an upper keel frame 401, a lower keel frame 402 and side keel frames, side keel frames include a left keel frame 403, a right keel frame 404 and a rear keel frame 405, the upper keel frame 401 and the lower keel frame 402 are formed by enclosing a sheet metal component, and the side keel frames 403, 404 and 405 are formed by connecting the upper keel frame 401 and the lower keel frame 402 through the sheet metal component. In this embodiment, the keel frame 4 is a steel keel frame, and may also be made of other metal or non-metal materials with a higher rigidity. In this embodiment, the steel keel frame comprises rectangular tubes 4a and angle steels 4b. Certainly, the rectangular tubes 4a may also be replaced with round steels, steels in other shapes and the like according to specific requirements. As shown in FIGS. 3, 5 and 6, the keel frame 4 is provided with reinforcing ribs 4c, and preferably, as shown in FIG. 4, the reinforcing ribs comprise a transverse lacing bar 4c01 and a longitudinal lacing bar 4c02, which may improve the stability and support force of the keel frame, thereby improving the load-bearing capacity of the cabinet body 1. The reinforcing ribs 4c can adopt rebars, round steels or other structures, and in this embodiment, the reinforcing ribs 4c may also adopt the rectangular tubes 4a.

The rear keel frame 405 opposite to the opening of the cabinet body 1 is provided with rectangular tubes 4a along the center line thereof, except that two edges in the keel frame 4 that are located on the side surface and parallel to the rectangular tubes 4a of the center line adopt angle steels 4b, and the remaining edges in the keel frame 4 adopt rectangular tubes 4a. That is, part of the rectangular tubes 4a form the frame body, and part of the rectangular tubes 4a form the reinforcing ribs 4c of the frame body.

Figure 12:
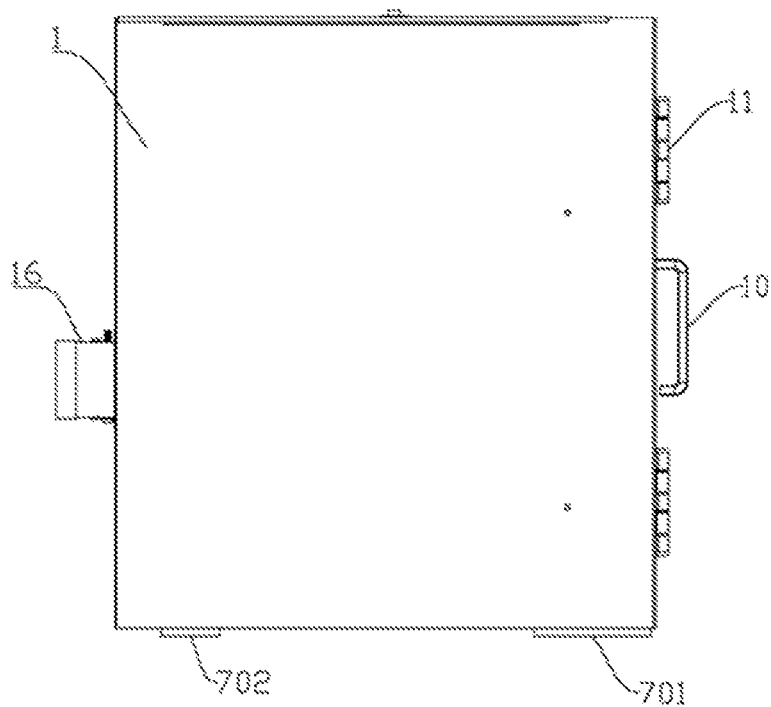
FIG. 12 is a side view according to application example I of the present application.
Figure 13:
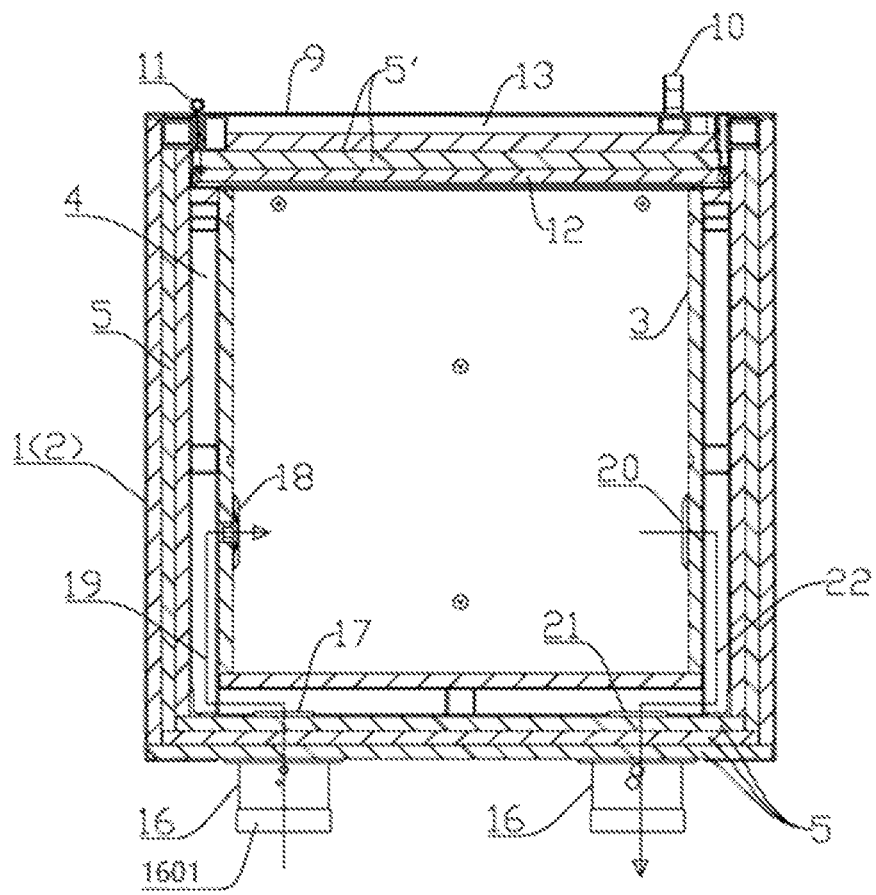
FIG. 13 is a schematic structural diagram of a partial cross section taken along B-B in FIG. 11.
Figure 17:
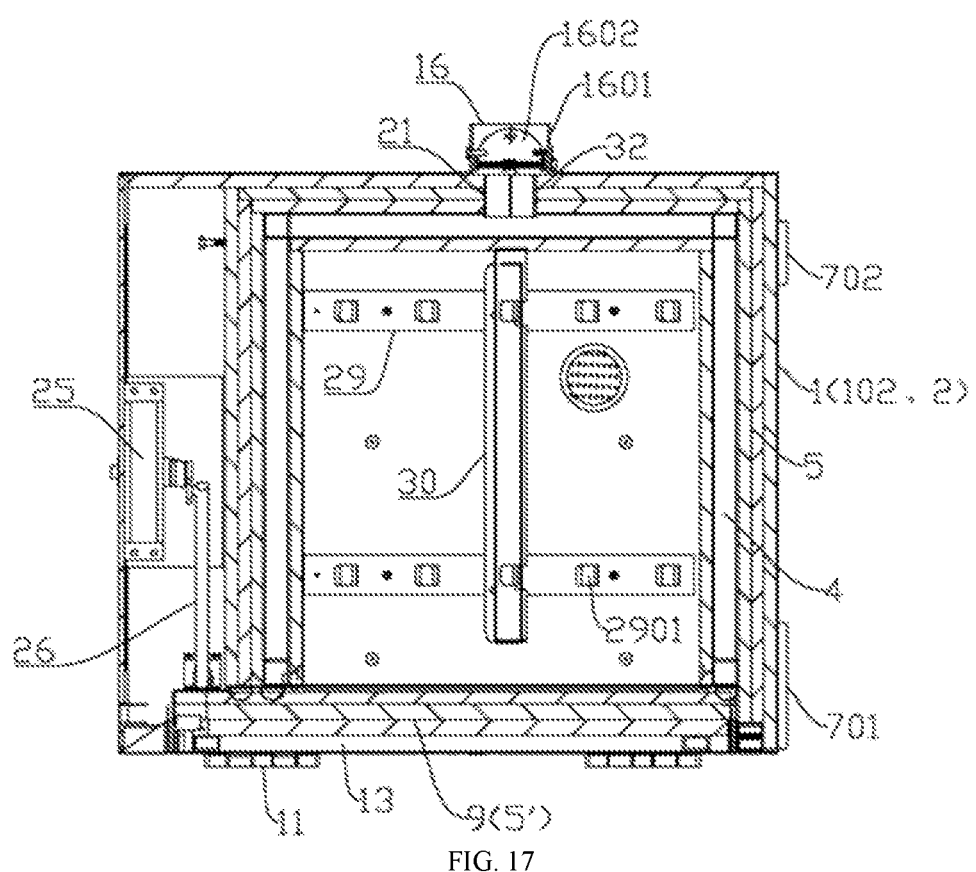
FIG. 17 is a schematic structural diagram of a cross section taken along C-C in FIG. 16.

A gap layer is formed by surrounding the rectangular tubes 4a parallel to two sides of any one of the angle steels 4b with the inner panel 3 and the gypsum board 5, that is, two angle steels 4b each correspond to one gap layer. In this embodiment, as shown in FIG. 13, a gap layer having an L-shaped cross section is formed by surrounding the rectangular tubes 4a arranged in the middle of the left keel frame 403 and the rear keel frame 405 with the corresponding inner panel 3 and gypsum board 5; and a gap layer having an L-shaped cross section is formed by surrounding the rectangular tubes 4a arranged in the middle of the right keel frame 404 and the rear keel frame 405 with the corresponding inner panel 3 and gypsum board 5, and the angle steels 4b are all located at the L-shaped corners. Two opposite inner panels 3 are provided with an air supply opening 18 and an air return opening 20 which communicate with the corresponding gap layer, an air inlet 17 corresponding to the air supply opening 18 and an air outlet 21 corresponding to the air return opening 20 are arranged on the gypsum board 5 located at a distal end of the gap layer, and as shown in FIGS. 12, 13 and 17, ventilation fire-retardant valves 16 are arranged on the air inlet 17 and the air outlet 21. one of two gap layers forms an air inlet channel, and the other gap layer forms an air outlet channel. which helps to reserve a gap for air circulation on a rear side of the cabinet body, thereby improving the ventilation safety performance of the safety cabinet; in particular, the adaptive changes made by the keel frame 4 according to the shape and size of different safety cabinets are all within the protection scope of the present application; and meanwhile, the upper keel frame 401, the lower keel frame 402, the left keel frame 403, the right keel frame 404 and the rear keel frame 405 may be adapted to the mounting of the reinforcing ribs 4c in different frame shapes.

For a single layer of gypsum board 5, the gypsum board 5 may be directly fixed on the keel frame 4 by screws 34a, and the gypsum boards 5 on the adjacent outer vertical surfaces of the keel frame 4 are seamlessly pieced together.

Figure 18:
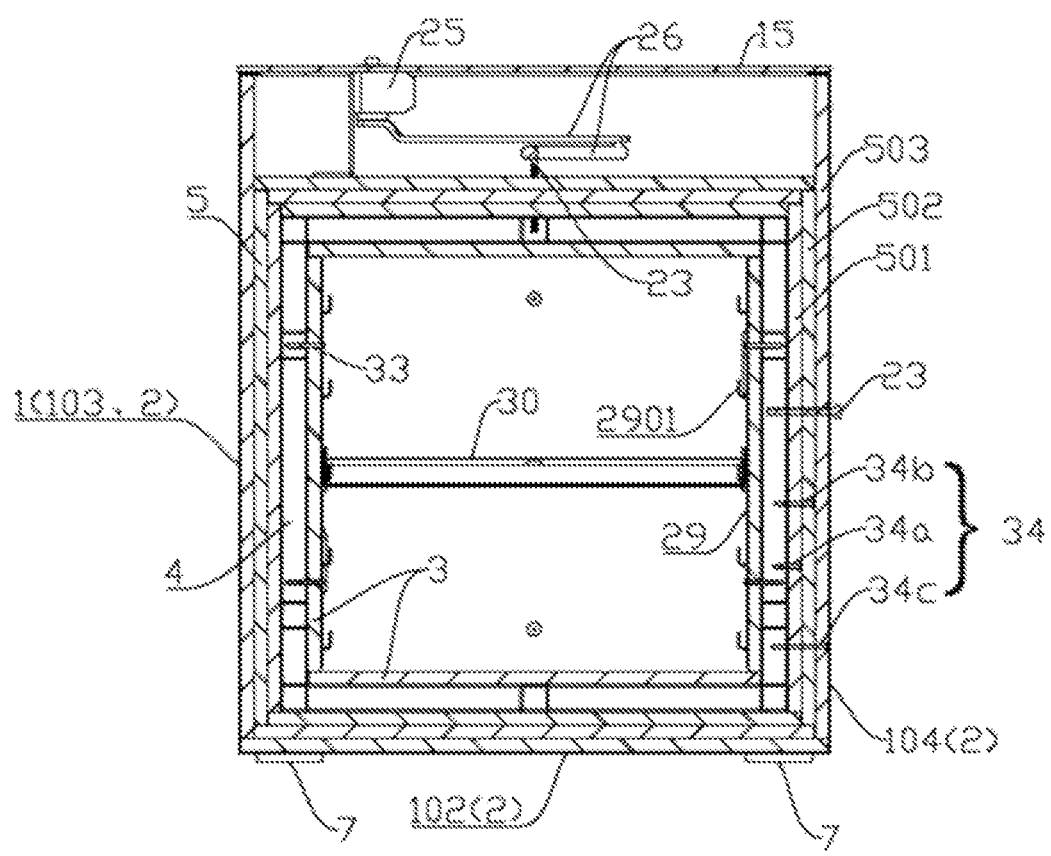
FIG. 18 is a schematic structural diagram of a cross section taken along D-D in FIG. 16.
Figure 19:
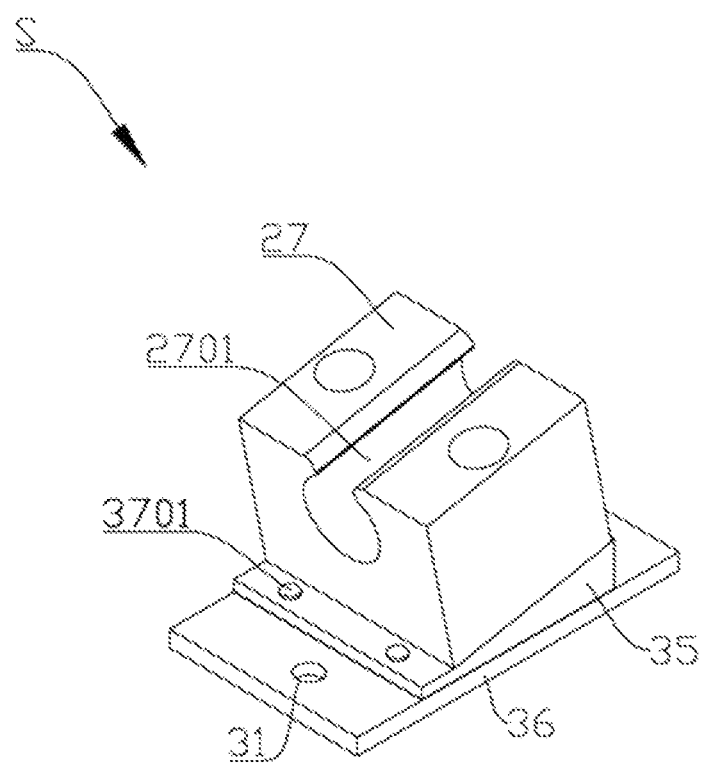
FIG. 19 is a schematic structural diagram of a deactivation assembly according to the present application.

For multi-layered gypsum boards 5 having two or more layers, the gypsum boards 5 are fixed to the keel frame 4 by screws 34 layer by layer, and specifically, an application example of the present application adopts the multi-layered gypsum boards, i.e., three layers of gypsum boards 5 for illustration. As shown in FIGS. 1 and 18, a first layer of gypsum board 501 is fixed to the keel frame 4 by screws 34a, the first layer of gypsum board 501 and a second layer of gypsum board 502 are fixed to the keel frame 4 by screws 34b, the first layer of gypsum board 501, the second layer of gypsum board 502 and a third layer of gypsum board 503 are fixed to the keel frame 4 by screws 34c, and the gypsum boards 5 are connected in series from different layers by screws 34 having different lengths and fixedly connected with the keel frame 4, so that the fastening among the gypsum boards 5 and between the gypsum boards 5 and the keel frame 4 may be enhanced, and the stability and the load-bearing capacity of the cabinet body 1 may be improved; and the cabinet body structure of the present application may support the multi-layered gypsum boards 5 to form the main body fireproof wall of the safety cabinet, thereby further enhancing the fireproof and safety performance.

Figure 28:
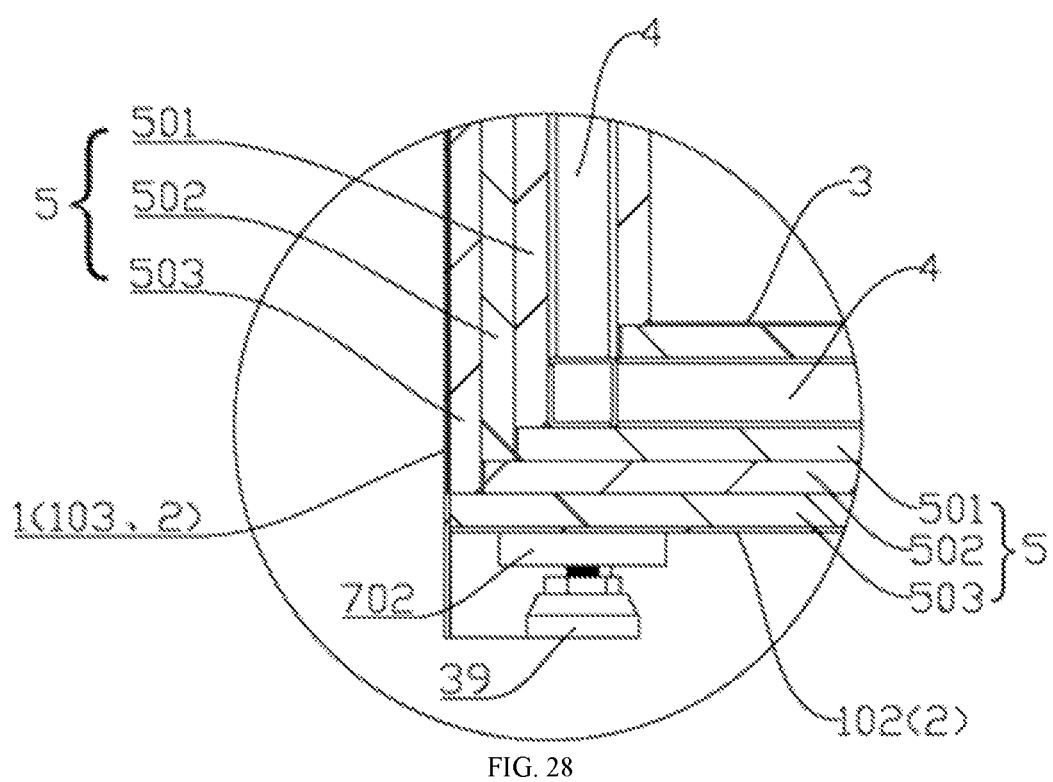
FIG. 28 is a schematic structural diagram enlarged at F in FIG. 27.

As shown in FIGS. 1 to 6, 10 to 18, and 25 to 29, the gypsum boards 5 are fixed to the outer sides of the upper keel frame 401, the lower keel frame 402, the left keel frame 403, the right keel frame 404 and the rear keel frame 405 layer by layer, and the inner panels 3 are fixed to the upper keel frame 401, the lower keel frame 402, the left keel frame 403, the right keel frame 404 and the rear keel frame 405 from the inner sides, so as to form five surfaces of the cabinet body 1, i.e., a top plate 101, a bottom plate 102, and side walls, wherein the side walls include a left side wall 103, a right side wall 104 and a rear wall 105; preferably, the inner panels 3 may be fixed to the rectangular tubes 4a of the keel frame 4 through screws to enhance stability, and may also be fixed to the tube walls of the rectangular tubes 4a of the keel frame 4 through countersunk screws to improve aesthetic property; and the gypsum boards 5 between the surfaces of the cabinet body 1 are pieced in a staggered manner layer by layer, as shown in FIGS. 1 and 28, the gypsum boards between layers are stacked on each other, and the edges of the multi-layered gypsum board of each outer vertical surface form a stepped abutting structure. The first layer of gypsum board 501 between the left side wall 103 and the bottom plate 102, the second layer of gypsum board 502 between the left side wall 103 and the bottom plate 102, and the third layer of gypsum board 503 between the left side wall 103 and the bottom plate 102 are pieced in a staggered manner, so that the gypsum boards among five surfaces of the cabinet body 1 form a stepped seam, the sealing performance of the joint is improved, and the whole structure is compact, firm and aesthetic.

As shown in FIGS. 1, 10, 25 and 27, the outer surfaces of the left side wall 103, the right side wall 104 and the bottom plate 102 of the cabinet body 1 are covered with the metal plates 2, the metal plates 2 are fixedly mounted to the keel frame 4 through the gypsum board 5 by screws, the top plate 101 of the cabinet body 1 is further covered with the outer panel 15, preferably, the outer panel 15 is the metal plate 2 or a decorative board made of a fireproof material, and preferably, the outer panel 15 may be selectively mounted on the outer side of the gypsum board 5 of the rear wall 105 of the cabinet body 1 to improve the aesthetic property and the fireproof and safety performance.

Figure 7:
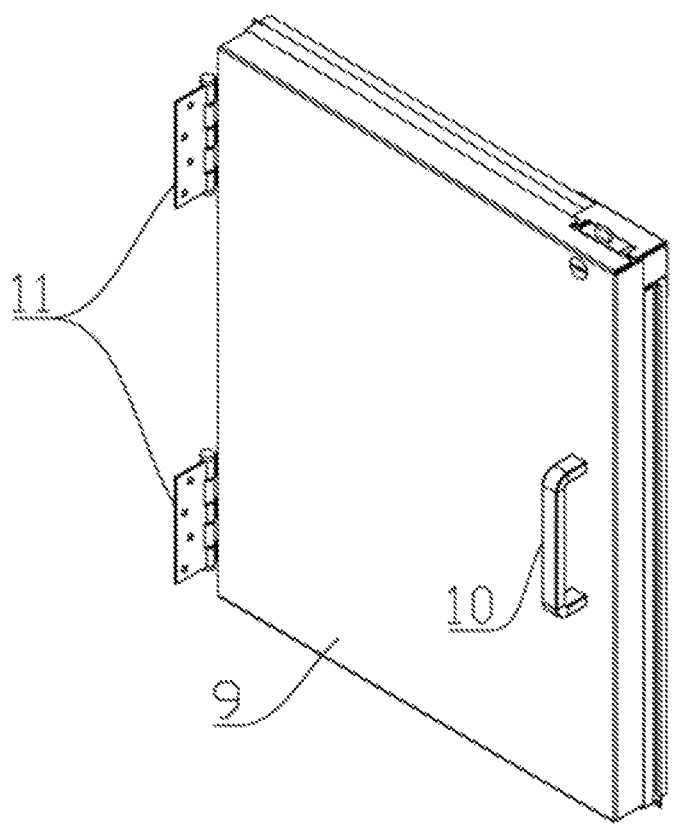
FIG. 7 is a schematic structural diagram of a cabinet door according to the present application.

As shown in FIGS. 1, 2 and 4, the cabinet body 1 further comprises a door frame 6, preferably, a quadrangular frame of the door frame 6 is formed by connecting the bottom part with the side parts end to end through the rectangular tubes 6b and connecting the top part through the angle steels 6a, so as to form a supporting frame of the cabinet door; as shown in FIGS. 1 and 7, connecting holes 8 are formed on the rectangular tubes 6b at the side parts of the door frame 6 for mounting hinges 11 to connect the cabinet door 9; as shown in FIGS. 1 and 2, the support legs 7 are mounted on the outer side of the bottom plate 102 of the cabinet body 1, the support legs 7 comprise long support legs 701 and short support legs 702, the support legs 7 at the front part of the cabinet body 1, i.e., the long support legs 701, are fixedly connected to the door frame 6 and the keel frame 4, preferably, at the left side and the right side of the door frame 6, the long support leg 701 are connected with the bottom end of the door frame 6 and the front bottom end of the keel frame 4 into a whole by adopting a manner that bolts penetrate through the metal plate 2 and the gypsum plate 5 of the bottom plate 102 of the cabinet body 1, thereby ensuring the strength and the load-bearing capacity of the gypsum board 5, the keel frame 4 and the door frame 6; and the support legs 7 located at the rear part of the cabinet body 1, i.e., the short support legs 702, are fixedly connected with the rear bottom end of the keel frame 4 through the bolts penetrating through the metal plate 2 and the gypsum board 5 of the bottom plate 102 of the cabinet body 1, which ensures the balance of the cabinet body 1 on the one hand, and improves the stability and the strength of the cabinet body 1 on the other hand.

A fireproof safety cabinet using the fireproof cabinet body structure comprises a cabinet body 1 and a cabinet door 9 mounted at an opening of the cabinet body 1, as shown in FIGS. 1, 7, 10, 14, 15, 25 and 29, a handle 10 is mounted on the cabinet door 9, and the cabinet door 9 is mounted to a door frame 6 through a hinge 11, so that the fireproof safety cabinet is formed.

Figure 15:
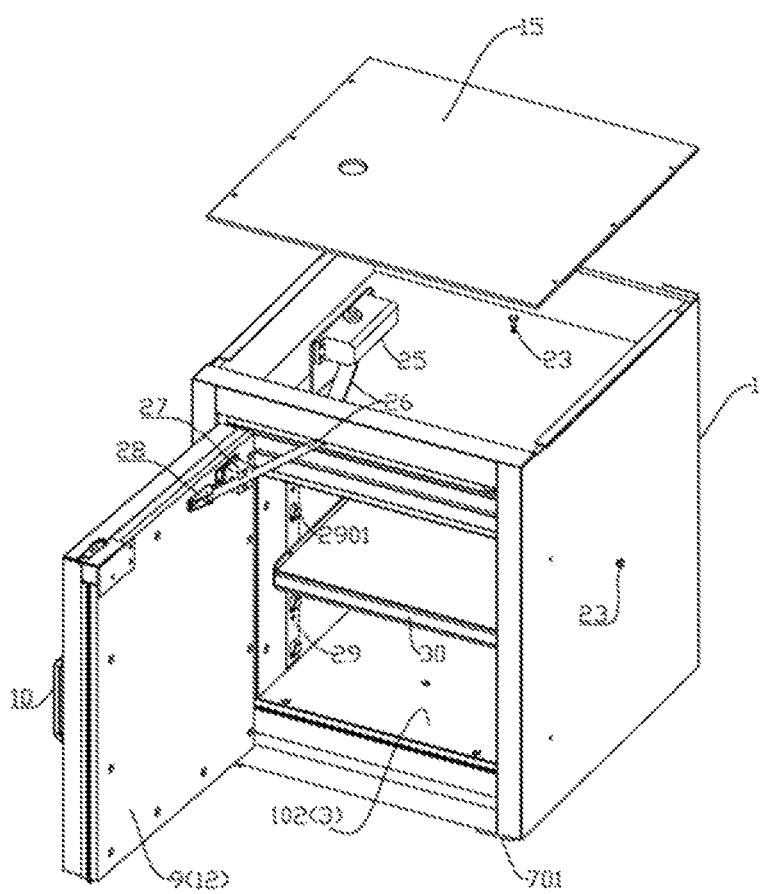
FIG. 15 is a schematic diagram of a door-opened state and a partially exploded structure according to application example II of the present application.
Figure 16:
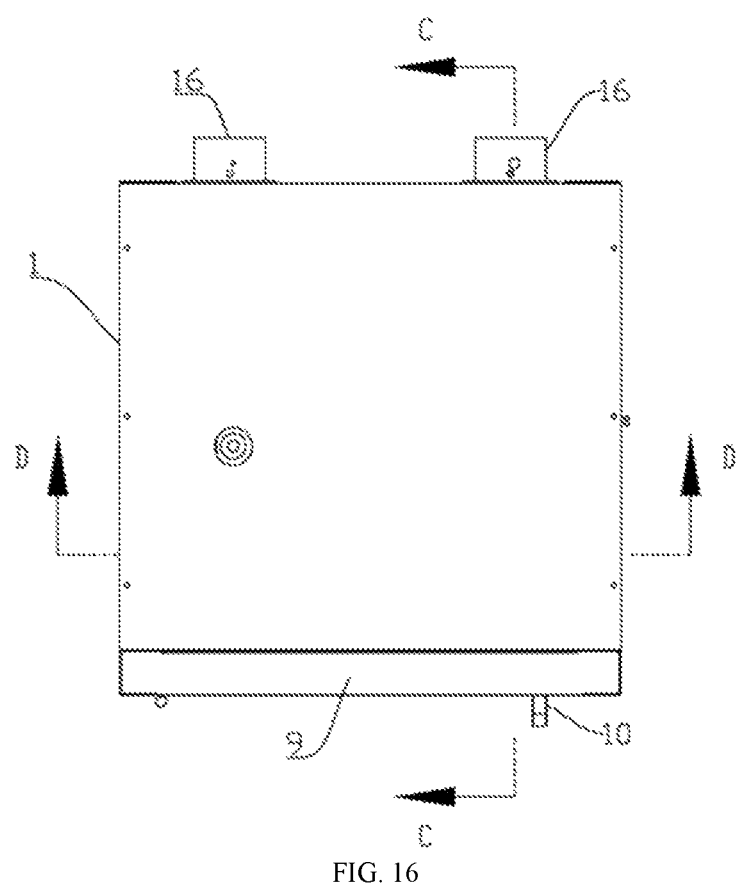
FIG. 16 is a top view according to application example II of the present application.

As shown in FIGS. 15 and 18, the cabinet body 1 is provided with electrostatic grounding bolts 23 connected with the keel frame 4 at the top part and/or side part of the cabinet body 1.

As shown in FIGS. 15, 17 and 18, the fireproof safety cabinet further comprises a metal shelf frame 29, wherein the metal shelf frame 29 is mounted on the inner panels 3 of two opposite side walls of the cabinet body 1 by metal fasteners, e.g., the metal screws 33, the metal fasteners are fixedly mounted to the keel frame 4 through the inner panels 3, and the metal shelf 30 is hooked to a first hook 2901 on the metal shelf frame 29.

Since the existing safety cabinet usually needs to lead out wires from the inside of the cabinet to prevent the damage caused by static electricity when a worker takes and puts the articles from the safety cabinet, the existing safety cabinet is not only inconvenient to use, but also affects the aesthetic property. In the present application, as shown in FIGS. 15 and 18, the left side wall 103, the right side wall 104 and the bottom plate 102 of the cabinet body 1 are coated with the metal plate 2, the metal shelf frame 29 is mounted to the insulating plate, i.e. the inner panel 3, in the cabinet body 1, the metal screws 33 for mounting and fixing the metal shelf frame 29 communicate with the steel keel frame 4 in the safety cabinet, and the steel keel frame 4 communicates with the metal plate 2 through the electrostatic grounding bolts 23; and when the worker with static electricity takes and puts the articles in the safety cabinet, the static electricity may be transmitted to the external electrostatic grounding devices communicating with the electrostatic grounding bolts 23 through the first hook 2901, the metal shelf frame 29, the metal screws 33, the keel frame 4 and the electrostatic grounding bolts 23 sequentially from the metal shelf 30, for example, the electrostatic grounding bolts 23 may be externally connected with a grounding line, so that the static electricity is effectively eliminated, and the safety performance and the production safety of the fireproof safety cabinet are improved.

Figure 8:
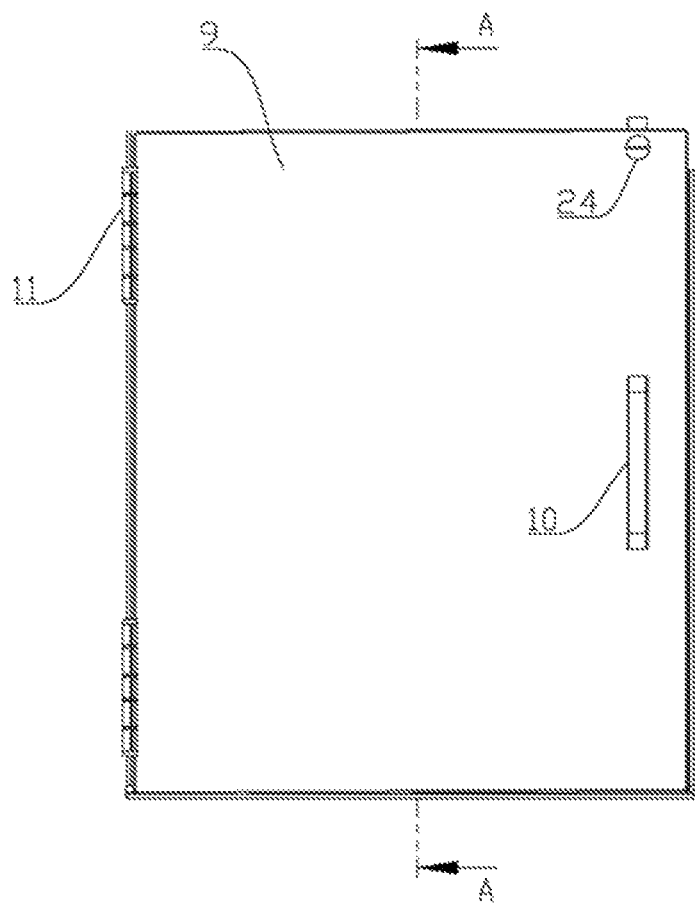
FIG. 8 is a front view of a cabinet door according to the present application.
Figure 9:
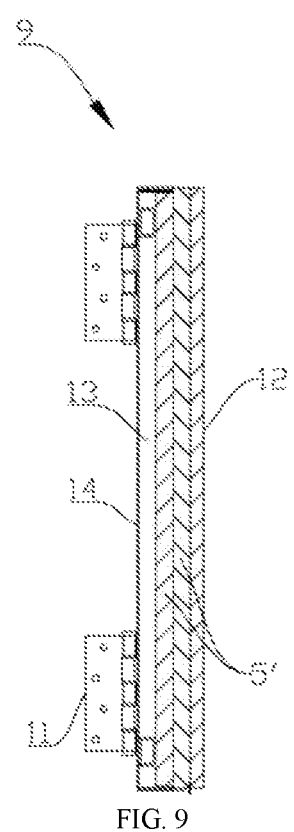
FIG. 9 is a schematic structural diagram of a cross section taken along A-A in FIG. 8.
Figure 14:
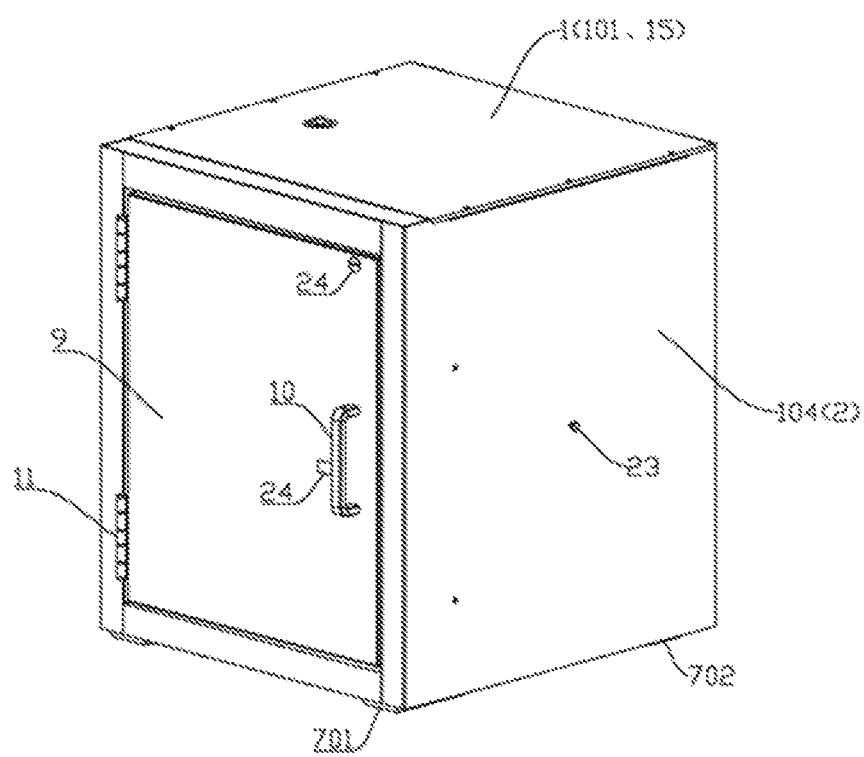
FIG. 14 is a schematic structural diagram of a door-closed state according to application example II of the present application.

In addition, the handle 10 and the back part of the handle 10 of the cabinet door 9, and/or the cabinet door 9 may also be provided with a bare metal stainless steel conductor, as shown in FIGS. 8, 9 and 14, in this application example, the cabinet door 9 is provided with the metal guide sheet 24, since the outer layer of the cabinet door 9 is the outer decorative metal plate 14, the metal guide sheet 24 is conducted with the outer decorative metal plate 14, and when a worker contacts the cabinet door, the static electricity carried by a human body may be conducted away through the metal guide sheet 24, so that the static electricity is eliminated, and operation safety is ensured.

Figure 20:
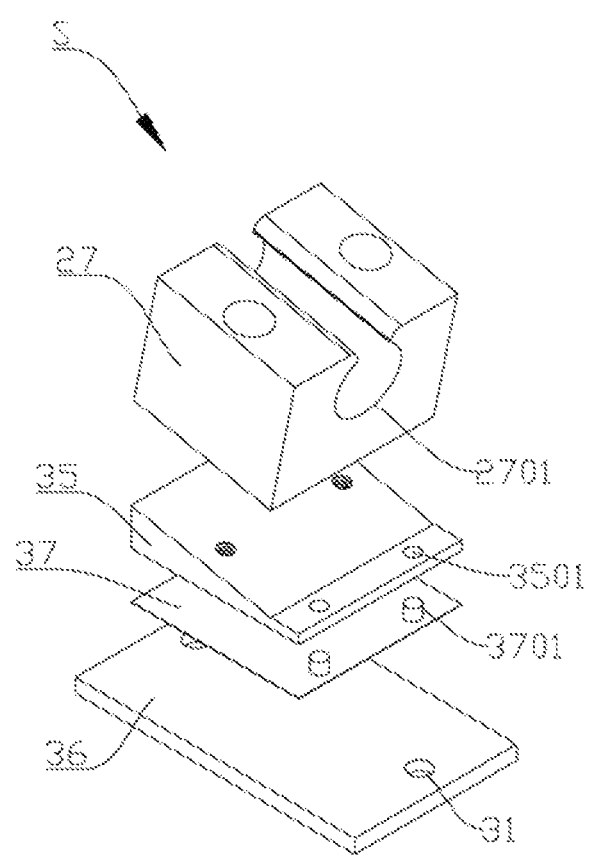
FIG. 20 is a schematic structural diagram of an exploded deactivation assembly according to the present application.
Figure 21:
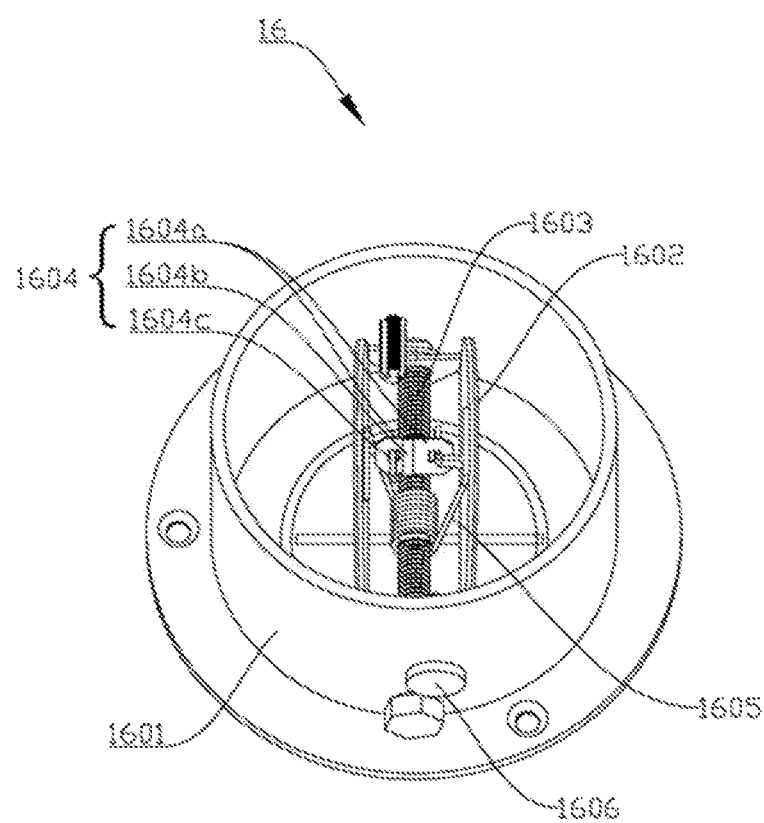
FIG. 21 is a schematic structural diagram of the ventilation state of a fire-retardant ventilation valve according to the present application.

As shown in FIGS. 15 to 20, the fireproof safety cabinet further comprises a deactivation device of the cabinet door 9, wherein the deactivation device of the cabinet door 9 comprises a door closer and a deactivation assembly S, the door closer comprises a main body 25 and a rocker arm 26, one end of the rocker arm 26 is connected with the main body 25, and the other end is mounted to the inner side of the cabinet door 9 through a mounting seat 28, the deactivation assembly S comprises an elastomer buckle 27, a metal adapter plate 35 and a metal fixing bottom plate 36, the elastomer buckle 27 is fixedly mounted to the metal adapter plate 35, the metal adapter plate 35 is fixedly connected with the metal fixing bottom plate 36 through a fusion layer 37, the metal fixing bottom plate 36 is mounted to the cabinet door 9, and the elastomer buckle 27 is provided with a clamping groove 2701 matched with a rocker arm 26 of the door closer; as shown in FIG. 20, the metal adapter plate 35 is a slope-type metal adapter plate, preferably, the fusion layer 37 may be made of a high-strength fusible alloy, such as a 70° fused high-strength fusible alloy, the high-strength fusible alloy is welded between the metal adapter plate 35 and the metal fixing bottom plate 36 to form a fusion layer 37, preferably, the metal adapter plate 35 is provided with a through hole 3501, and the through hole 3501 is filled with the high-strength fusible alloy during welding to form a bump 3701, so that the connection strength of the metal adapter plate 35 may be enhanced, and accidental falling may be prevented; as shown in FIG. 15, when the cabinet door is opened, the rocker arm 26 of the door closer is clamped into the clamping groove 2701 of the elastomer buckle, so that the deactivation of the cabinet door 9 may be achieved, and the articles may be conveniently taken out from the cabinet or put into the cabinet; and at the moment, if a fire accident occurs, when the temperature reaches the melting point of the fusion layer, the fusion layer melts to separate the metal adapter plate 35 from the metal fixing bottom plate 36, the door closer recovers a free state, and the cabinet door 9 may be automatically closed under the action of the door closer, so that the fireproof and safety is ensured.

Figure 24:
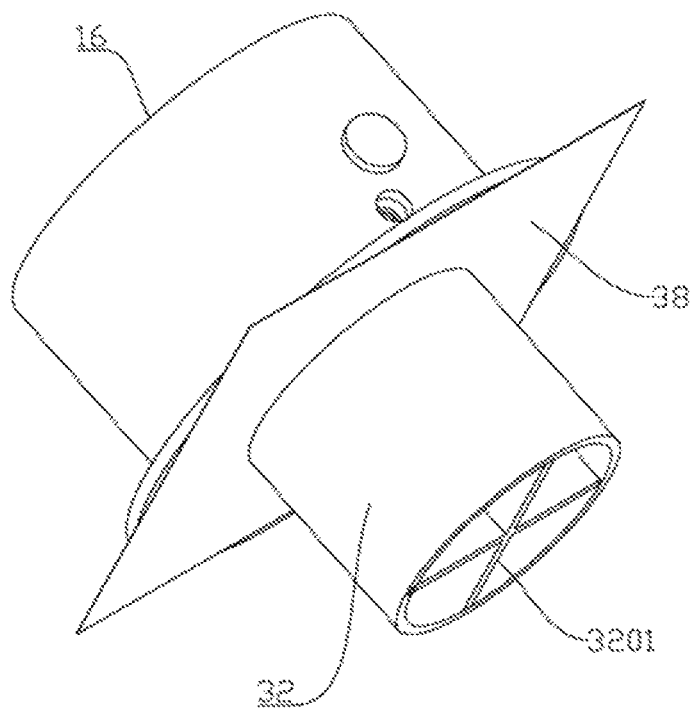
FIG. 24 is a schematic structural diagram of a fire-retardant ventilation valve and a fireproof expansion rubber strip according to the present application.

As shown in FIGS. 13, 16, 17 and 24, the ventilation fire-retardant valves 16 are mounted at an air inlet 17 and an air outlet 21 of the cabinet body 1, an inner side of the cabinet body 1 is provided with an air supply opening 18 corresponding to the air inlet 17 and an air return opening 20 corresponding to the air outlet 21, as shown in FIGS. 1 and 13, the keel frame 4 connected and built by the rectangular tubes 4a and the angle steels 4b is formed with a gap layer without a frame between the inner panel 3 and the gypsum board 5, so that the gap layer may form an air inlet channel with the air inlet 17 and the air supply opening 18, and the gap layer may form an air outlet channel with the air outlet 21 and the air return opening 20, in FIG. 13, 19 represents an air inlet route, and 22 represents an air outlet route, so that the cabinet body has a good ventilation effect, and the safety performance of the fireproof safety cabinet is ensured, preferably, as shown in FIGS. 17 and 24, a circle of back glue-type fireproof expansion rubber strip 32 is adhered circumferentially along the inner side walls of the air inlet 17 and the air outlet 21 (the fireproof expansion rubber strip 32 of the air inlet 17 not shown), and the cross-shaped, #-shaped or Union-Jack-shaped fireproof expansion rubber strips 3201 are bonded on the inner sides for supporting, so that the stability of the back glue-type fireproof expansion rubber strips 3201 is enhanced, and after burning in fire, the expansion strip can expand into a mass with a volume which is several times the volume of the expansion strip, thereby directly filling up the ventilation hole channel, effectively blocking the speed of internal transmission of flame and heat, and ensuring fireproof and safety.

Figure 22:
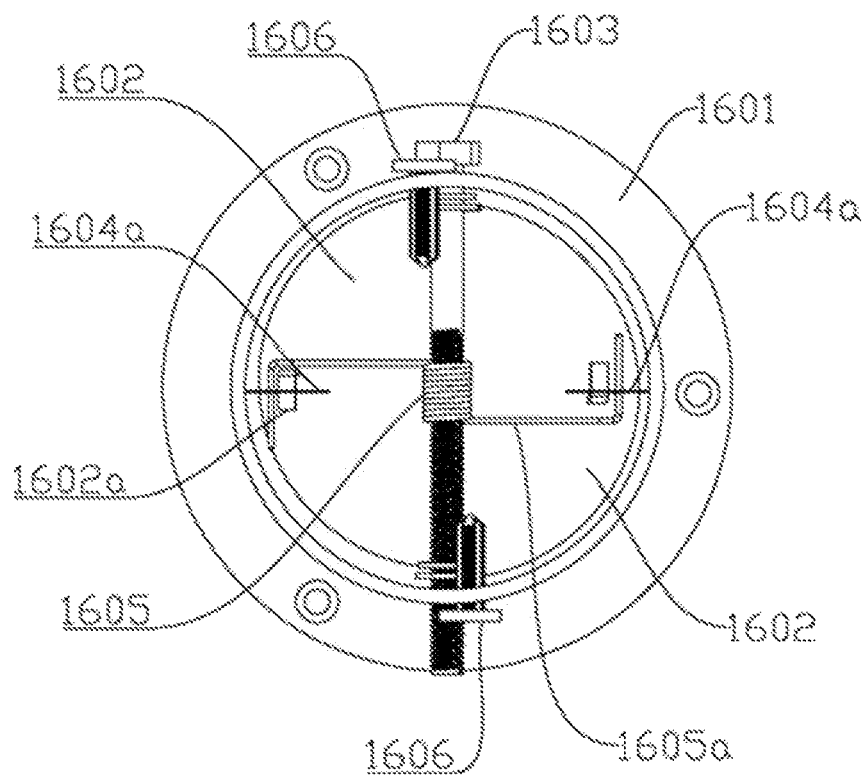
FIG. 22 is a schematic structural diagram of the fire-retardant state of a fire-retardant ventilation valve according to the present application.
Figure 23:
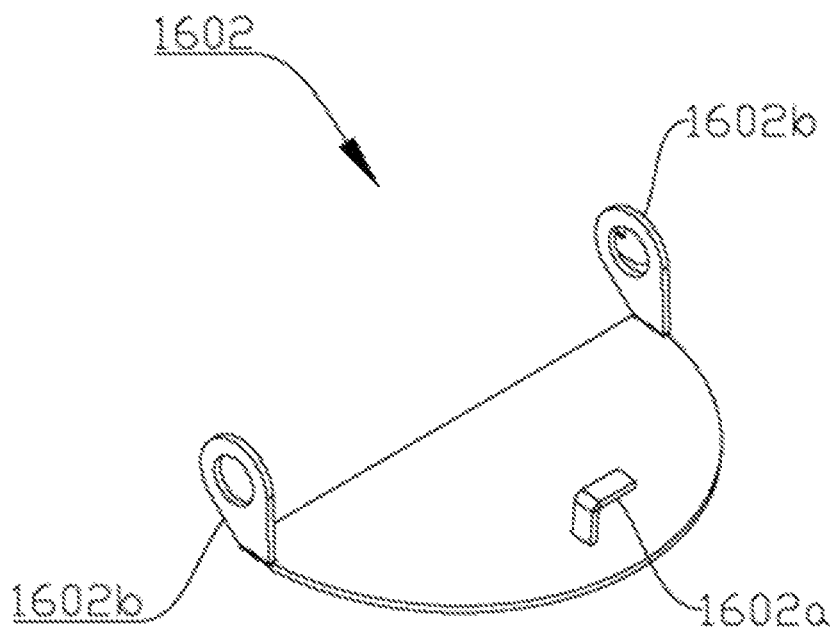
FIG. 23 is a schematic structural diagram of a fire-retardant disc according to the present application.

As shown in FIGS. 13, 16, 17, and 21 to 24, the ventilation fire-retardant valve 16 comprises a valve body and a fire-retardant disc 1602, preferably, the valve body adopts a neck flange 1601 which is convenient to mount; a fixed shaft 1603 is mounted at the neck part of the neck flange 1601, preferably, the fixed shaft 1603 is a screw rod, the fire-retardant discs 1602 are arranged on the fixed shaft 1603 in a penetrating manner through ear holes 1602b and are arranged oppositely, two ends of the fuse link 1604 are hooked to second hooks 1602a on the fire-retardant discs 1602, the fixed shaft 1603 is further provided with a torsion spring 1605 in a penetrating manner, and torsion feet 1605a of the torsion spring 1605 are abutted against the inner side surface of the fire-retardant discs 1602, preferably, rivets 1606 may be mounted between the fire-retardant discs 1602 and between two opposite sides of the neck part of the neck flange 1601 to prevent the fire-retardant discs 1602 from turning over laterally to cover the air inlet 17 or the air outlet 21 in a ventilation state and hindering ventilation; the fuse link 1604 comprises copper sheets 1604a, the copper sheets 1604a are provided with hanging openings 1604c for hanging the second hooks 1602a, the two copper sheets 1604a are reversely overlapped and welded together through fusing alloy 1604b at the end parts of the copper sheets 1604a, when a fire accident occurs, if the ambient temperature reaches the melting point of the fusing alloy, the fusing alloy melts into a liquid to separate the overlapping copper sheets, the torsion spring returns to the free state, and the torsion feet abutting against the inner sides of the fire-retardant discs 1602 will open the two upright fire-retardant discs 1602, as shown in FIG. 22, therefore, the air inlet 17 and the air outlet 21 of the cabinet body 1 are tightly covered under the action of the torsion spring force, the fire and hot air are blocked from entering the cabinet body 1 through the air inlet 17 and the air outlet 21, and the functions of heat insulation and fire retardant are achieved; and preferably, dense mesh stainless steel net sheets 38 are arranged between the neck flange 1601, the air inlet 17 and the air outlet 21, the function of filtering impurities may be achieved in a ventilation state, and the flame and heat may be prevented from being transmitted into the cabinet body 1 in the fire-retardant and heat-insulation state.

As shown in FIGS. 7 to 9, the handle 10 is mounted on the cabinet door 9, the cabinet door 9 comprises an outer decorative metal plate 14 and an inner decorative plate 12, and a steel frame 13 and a fireproof layer are sequentially arranged between the outer decorative metal plate 14 and the inner decorative plate 12 from outside to inside, preferably, the fireproof layer is a gypsum board 5', the gypsum board 5' has at least one layer, and this application example selects two-layered gypsum boards 5; the inner panel 3 of the cabinet body 1 and the inner decorative plate 12 of the cabinet door 9 may adopt a double-sided laminated magnesium oxysulfide refractory decorative board, which may not only improve the aesthetic property of the interior of the safety cabinet, but also serve as an internal fireproof barrier for the cabinet body 1, thereby prolonging the fireproof life.

Preferably, the transverse and longitudinal gaps among the cabinet body structure, between the door and the cabinet body 1, and among the doors may be filled, supplemented or caulked by adopting high-temperature-resistant fire-retardant cloth, rubber fire-retardant sealing expansion strips, rubber fire-retardant expansion strips and the like made of medium and high silica cloth, alkali-free fiber cloth and the like, so that the sealing property of the fireproof safety cabinet is ensured, and the fireproof and heat-resistant performances of the fireproof safety cabinet are improved.

Figure 10:
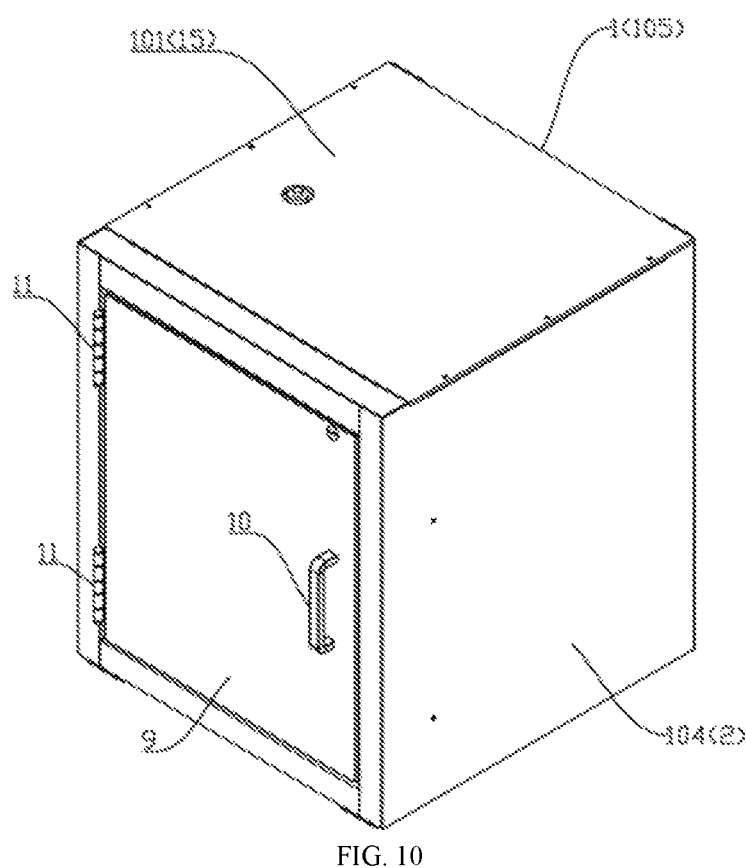
FIG. 10 is a schematic structural diagram according to application example I of the present application.
Figure 11:
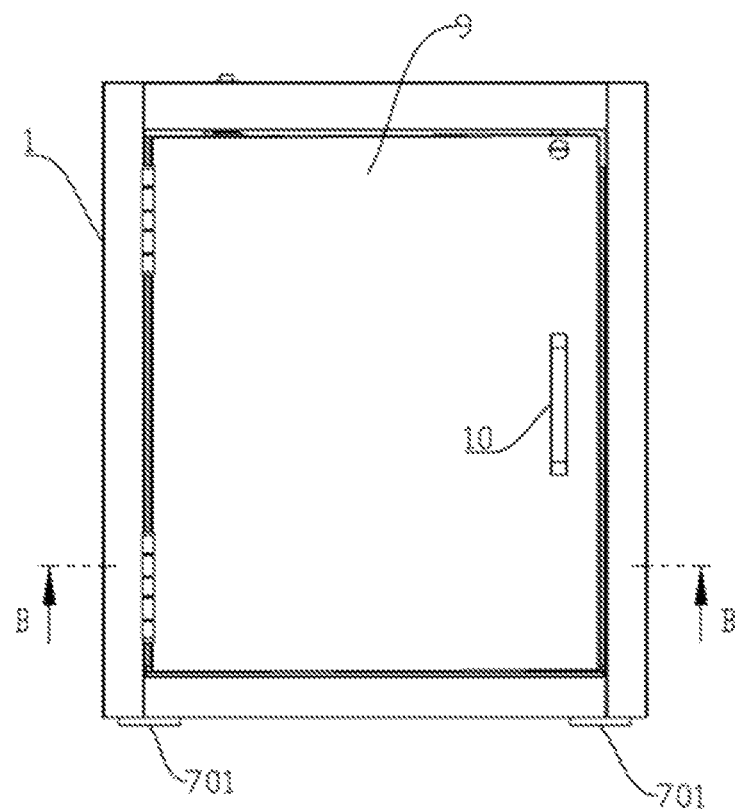
FIG. 11 is a front view according to application example I of the present application.
Figure 25:
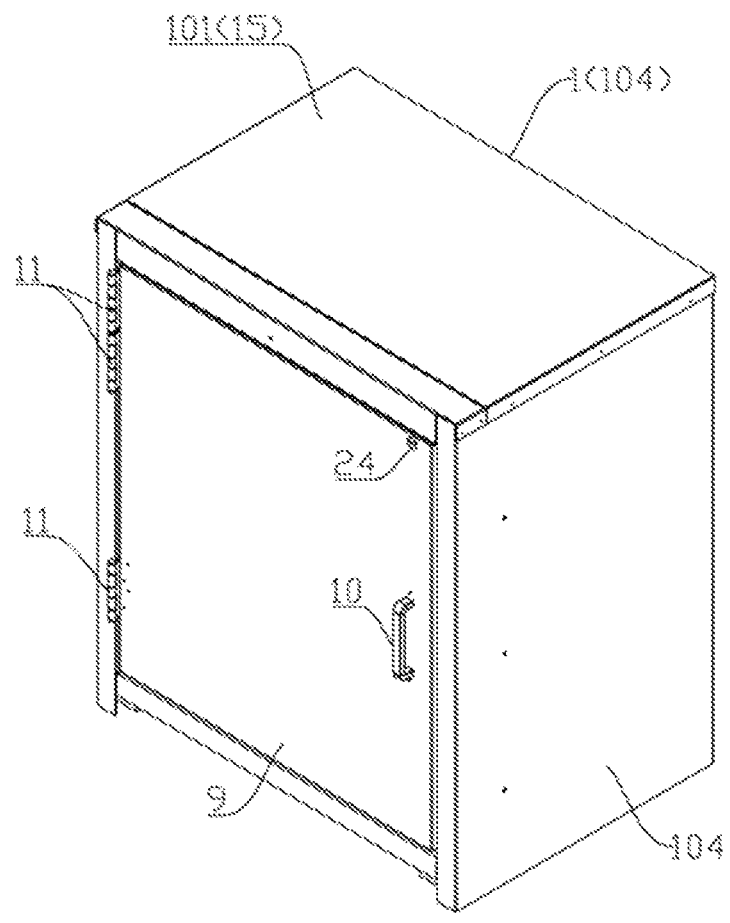
FIG. 25 is a schematic structural diagram according to application example III of the present application.
Figure 26:
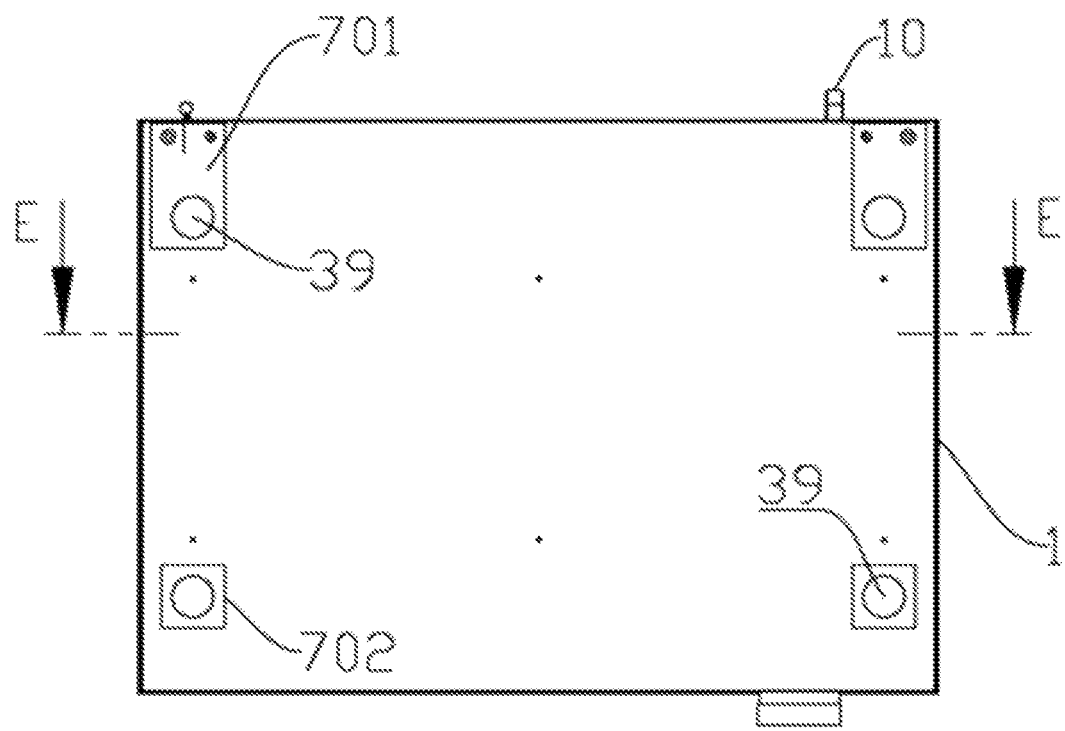
FIG. 26 is a bottom view according to application example III of the present application.
Figure 27:
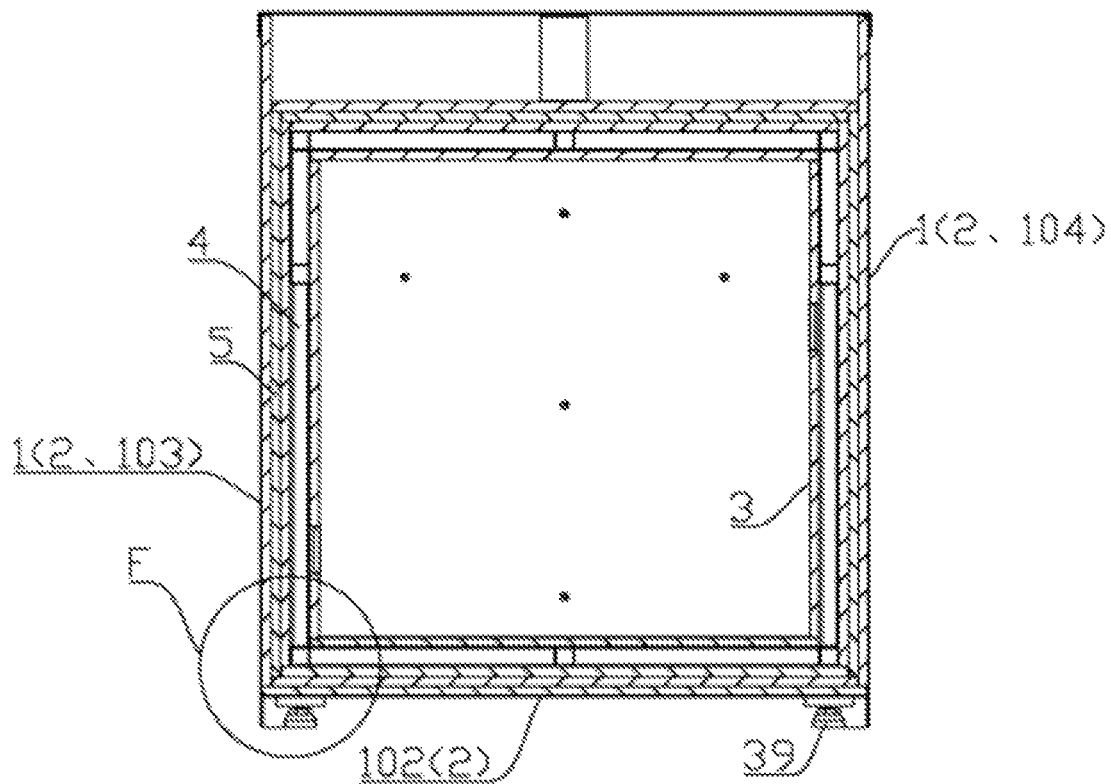
FIG. 27 is a schematic structural diagram of a cross section taken along E-E in FIG. 26.
Figure 29:
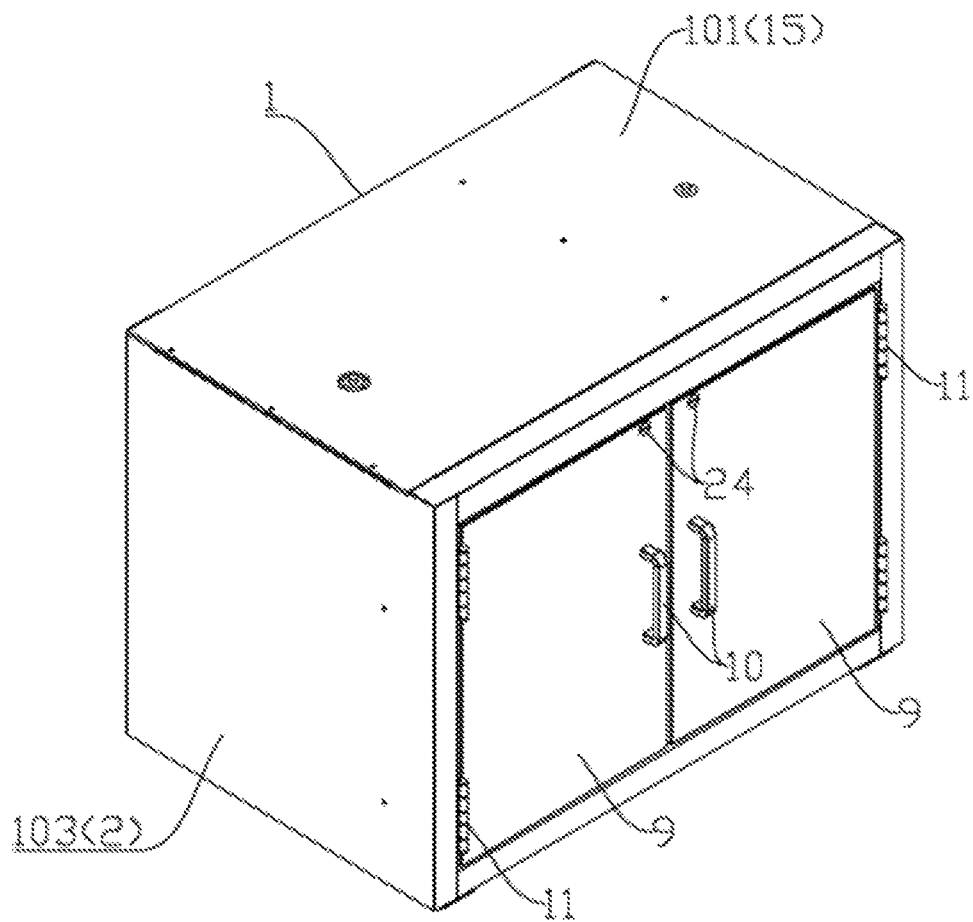
FIG. 29 is a schematic structural diagram according to application example IV of the present application.

As shown in FIGS. 25 to 28, at the support legs 7, foundation bolts 39 penetrate through the metal plate 2 and the gypsum board 5 and are fixedly connected with the keel frame 4, so that the supporting and stabilizing effects on the cabinet door may be enhanced; preferably, the cabinet door 9 is mounted to the door frame 6 through three hinges 11, wherein two hinges 11 are located at the upper end of the cabinet door, one hinge 11 is located at the lower end of the cabinet door, and the three hinges 11 are vertically arranged, so that the mounting stability of the cabinet door may be improved; and as shown in FIGS. 10, 14 and 25, the fireproof safety cabinet using the fireproof cabinet body structure is of a single-door type; as shown in FIG. 29, the fireproof safety cabinet using the fireproof cabinet body structure is a double-door type.

It is obvious that the embodiments described above are only examples for clear description, and do not pose a limitation on the implementation. For those of ordinary skill in the art, other variations or modifications in different forms may also be made based on the above description. It is not necessary and impossible to exhaustively list all the implementations here, and obvious variations or modifications derived therefrom are still within the protection scope of the present application.

What is claimed is:

1. A fireproof cabinet body structure, comprising:
    a cabinet body, wherein an opening is arranged on one side of the cabinet body and is suitable for mounting a cabinet door, and the cabinet body comprises a keel frame and at least one layer of gypsum board fixed on an outer vertical surface of the keel frame; adjacent gypsum boards are seamlessly pieced together; the keel frame has a rigidity greater than that of the gypsum board; and
    a plurality of support legs, wherein the plurality of support legs penetrate through the gypsum board and are fixedly connected with the keel frame;
    wherein a direction of the supporting force of any one of the support legs is the same as an extending direction of a vertical beam in the keel frame;
    the keel frame is a steel keel frame;
    the keel frame comprises rectangular tubes and angle steels; a side surface of the cabinet body that is opposite to the opening is provided with the rectangular tubes along the center line thereof; except that two edges in the keel frame that are located on the side surface and parallel to the rectangular tubes of the center line adopt angle steels, and the remaining edges in the keel frame adopt rectangular tubes;
    an inner vertical surface of the keel frame is further provided with an inner panel; and a gap layer is formed by surrounding the rectangular tubes parallel to two sides of any one of the angle steels with the inner panel and the gypsum board;
    two opposite inner panels are provided with an air supply opening and an air return opening which communicate with the corresponding gap layer; an air inlet corresponding to the air supply opening and an air outlet corresponding to the air return opening are arranged on the gypsum board located at a distal end of the gap layer; ventilation fire-retardant valves are arranged on the air inlet and the air outlet; and
    one of two gap layers forms an air inlet channel, and the other gap layer forms an air outlet channel.

2. The fireproof cabinet body structure according to claim 1, wherein the ventilation fire-retardant valve comprises a valve body and fire-retardant discs, a fixed shaft is mounted on the valve body, the fire-retardant discs are arranged on the fixed shaft in a penetrating manner and are oppositely disposed, two ends of a fuse link are hooked to a second hook on the fire-retardant disc, the fixed shaft is further provided with a torsion spring in a penetrating manner, and torsion feet of the torsion spring are abutted against an inner side surface of the fire-retardant disc.

3. The fireproof cabinet body structure according to claim 1, wherein at least two layers of gypsum boards are arranged on the outer vertical surface of the keel frame; and the gypsum boards between layers are stacked on each other, and edges thereof form a stepped abutting structure.

4. The fireproof cabinet body structure according to claim 1, wherein reinforcing ribs are arranged in the keel frame.

5. The fireproof cabinet body structure according to claim 1, wherein peripheral side walls and an outer surface of the bottom part of the cabinet body are covered with metal sheets, and the top part of the cabinet body is covered with an outer panel.

6. The fireproof cabinet body structure according to claim 1, wherein the top and/or side walls of the cabinet body are provided with electrostatic grounding devices connected with the keel frame.

7. A fireproof safety cabinet, comprising:
    the fireproof cabinet body structure according to claim 1,
    a cabinet door mounted on an opening at one side of the cabinet; and
    a door frame arranged along an edge of the opening of the cabinet body and fixedly connected with the keel frame; wherein
    the door frame is a steel structure frame; both the door frame and the keel frame are fixedly connected with the support legs; and
    the cabinet door is hinged on the door frame.

8. The fireproof safety cabinet according to claim 7, wherein the cabinet door comprises an outer decorative metal plate and an inner decorative plate, and a steel frame and a fireproof layer are sequentially arranged between the outer decorative metal plate and the inner decorative plate from outside to inside;

a handle is arranged on the cabinet door; and a stainless steel conductor is arranged on a surface of the cabinet door and/or the handle.

9. The fireproof safety cabinet according to claim 7, further comprising a metal shelf frame, wherein the metal shelf frame is mounted on two opposite side walls of the cabinet body by metal fasteners, the metal fasteners are fixedly mounted to the keel frame, and a metal shelf is hooked to a first hook on the metal shelf frame.

10. The fireproof safety cabinet according to claim 7, wherein a high temperature fire-retardant cloth and a rubber fire-retardant expansion strip are arranged at a gap between the cabinet body and the cabinet door.

11. The fireproof safety cabinet according to claim 7, further comprising a cabinet door deactivation device, wherein the cabinet door deactivation device comprises a door closer and a deactivation assembly, the deactivation assembly comprises an elastomer buckle, a metal adapter plate and a metal fixing bottom plate, the elastomer buckle is fixedly mounted to the metal adapter plate, the metal adapter plate is fixedly connected with the metal fixing bottom plate through a fusion layer, the metal fixing bottom plate is mounted to the cabinet door, and the elastomer buckle is provided with a clamping groove matched with a rocker arm of the door closer.

\* \* \* \* \*